United States Patent [19]

Pheonix

[11] Patent Number: 5,575,543
[45] Date of Patent: Nov. 19, 1996

[54] ELECTRONIC BRAKING CONTROL SYSTEM

[75] Inventor: John B. Pheonix, Birmingham, United Kingdom

[73] Assignee: Lucas Industries PLC., Solihull, England

[21] Appl. No.: 337,407

[22] Filed: Nov. 8, 1994

[30] Foreign Application Priority Data

Nov. 8, 1993 [GB] United Kingdom ............... 9322956

[51] Int. Cl.$^6$ ........................................ B60T 8/58
[52] U.S. Cl. ................................ 303/155; 303/167
[58] Field of Search ........................... 303/3, 15, 127, 303/155, 166, 167, 113.1, 115.1, 116.1

[56] References Cited

U.S. PATENT DOCUMENTS

| | | | |
|---|---|---|---|
| 3,975,091 | 8/1976 | Kondo et al. | 303/115.1 |
| 4,787,683 | 11/1988 | Singleton | 303/127 |
| 4,850,650 | 7/1989 | Eckert et al. | 303/155 X |
| 5,288,139 | 2/1994 | Singleton et al. | 303/20 X |

FOREIGN PATENT DOCUMENTS

| | | |
|---|---|---|
| 0157944 | 10/1985 | European Pat. Off. . |
| 4006096 | 8/1991 | Germany . |
| 4129287 | 3/1992 | Germany . |
| WO88/07950 | 10/1988 | WIPO . |
| WO93/25419 | 12/1993 | WIPO . |

*Primary Examiner*—Lee W. Young
*Attorney, Agent, or Firm*—Oblon, Spivak, McClelland, Maier & Neustadt, P.C.

[57] ABSTRACT

In an electronically controlled braking system which incorporates anti-lock brake control and includes a plurality of brake pressure control valves having associated local electronic control units which communicate with a master electronic control unit, part of the anti-lock brake control logic for a wheel is performed by the electronic control unit associated with the pressure control valve for that wheel, with the remainder of the anti-lock brake control logic for that wheel being performed by the master electronic control unit. The local valve-associated electronic control unit includes skid detection logic which causes the brake pressure at the associated wheel to be reduced in response to a wheel skid detected thereby, brake pressure at that wheel being controlled thereafter, at least for a defined period, according to demands communicated to the local control unit from the master control unit.

18 Claims, 6 Drawing Sheets

ELECTRONIC BRAKING CONTROL SYSTEM

BACKGROUND OF THE INVENTION

1. Field of the Invention

The present invention is concerned with electronic braking control systems for motor vehicles.

2. Discussion of the Background

Some modern proposed electronic braking control systems have a number of brake pressure control valves distributed around a vehicle, with a single controlling computer responsible for determining the appropriate brake pressure for each wheel or group of wheels on the vehicle.

A brake pressure control valve may consist of a number of solenoids, and possibly brake pressure and other transducers. This entails a large number of connections to the valve. The length and complexity of the wiring to the valve can be reduced by providing a small computer close to, or physically within the valve. This local computer can receive instructions from the master controller via a communications link, and control the operation of the solenoids within the valve to produce the brake pressure changes demanded by the master controller. The local controller can also process signals from the transducers associated with each valve, and pass this data back along the communications link to be master controller.

If these braking control systems are to perform anti-lock braking functions, then wheel speed sensors are necessary at some or all of the vehicle wheels. In some systems, these sensors are connected directly to the master controller. However, where there is a computer in the local brake pressure control valve, the signals from the wheel speed sensors are in some cases taken to this local controller rather than the master. This local computer converts the stream of pulses from the, for example, variable reluctance transducer into a digital signal which is passed to the master controller along the communications link. This reduces the length of the wiring from the sensor, and also the processing load on the master controller.

An example of a known braking system for a four wheel vehicle consists of four brake pressure control valves, one at each wheel, with the wheel speed sensor at each wheel providing a signal to its local brake pressure control valve. Each valve contains a small local computer based controller which converts the pulses from the wheel speed sensors into digital values and passes these along a communications link to a central master controller. This master controller is connected to a transducer at the brake pedal which indicates the driver's brake demand. The master controller uses the driver's brake demand to calculate an appropriate brake pressure for each wheel, and instructs each valve to produce this pressure at its brake. The valve controllers compare the brake pressure demanded by the master controller with that measured by a transducer connected to the local brake, and generate the appropriate solenoid activity to bring the local brake pressure into line with the demand from the master controller.

Figure 5:
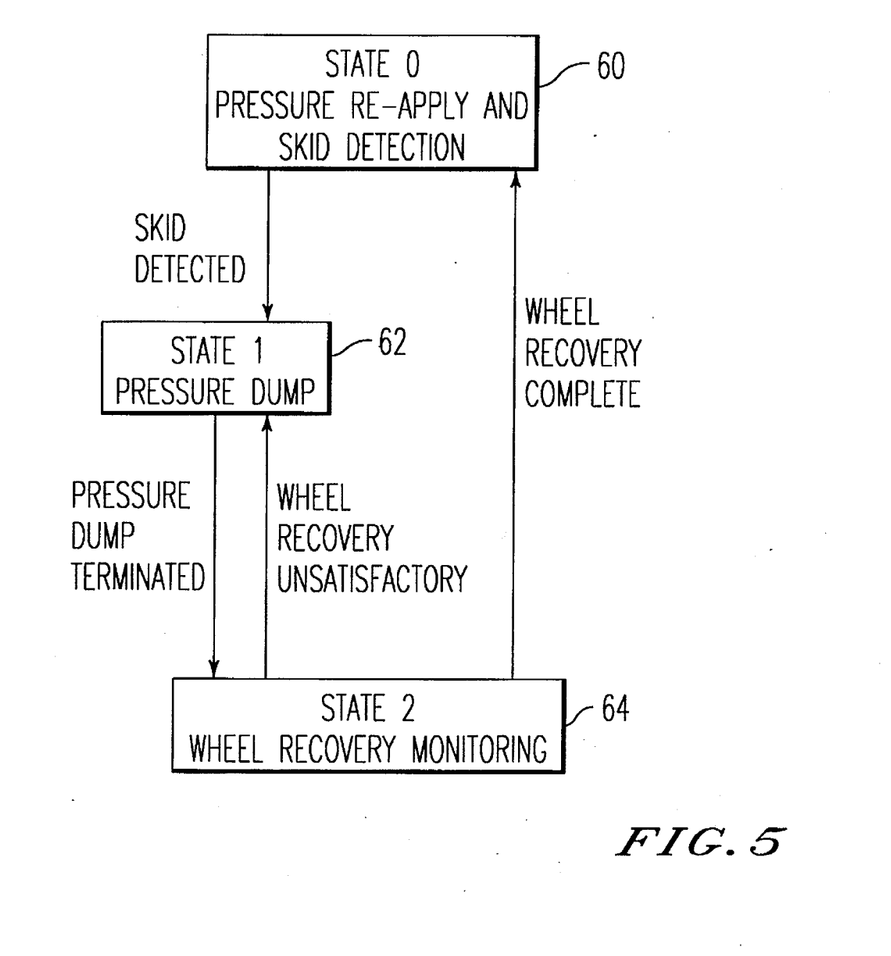
FIG. 5 is an illustrative diagram showing the "three states" into which ABS activity can be organized.

In the event of a wheel skidding because of excessive brake pressure being applied, anti-lock brake control must come into operation. Anti-lock brake control is somewhat empirical in nature, and so there are many different ways in which good control can be achieved. An example algorithm for an Anti-lock Braking System (ABS) is organized into 3 states (FIG. 5). At any time, each wheel will be designated as being in one of the three states, and the brake pressure at that wheel will be controlled by logic associated with that particular state.

State 0 (box 60) is the skid detection state. When a wheel is not skidding, its measured speed will be close to the speed of the vehicle on the road, and the wheel will be in state 0. While in state 0, the speed and acceleration of the wheel are monitored. When a wheel begins to skid, it will normally decelerate at a rate which is greater than the maximum rate at which the vehicle can decelerate. This deceleration can be detected and taken as an early indication that a skid is imminent. As the skid develops, the speed of the wheel will fall substantially below the speed of the vehicle on the road. If the vehicle speed is known, the difference between vehicle speed and wheel speed (wheel slip) can be used as another indication that a skid is developing. When some predetermined combination of wheel slip and deceleration have been seen, the wheel will move into state 1 (box 62). This transition occurs at point A on FIG. 2.

State 1 is the pressure dump state. When a skid has been detected and the wheel has moved into state 1, the pressure in the brake associated with that wheel will be reduced at a rapid rate. Normally, the braking medium (hydraulic fluid or air) is released through a restriction, so the rate at which the pressure drops will depend on the pressure in the brake. The appropriate duration for the pressure dump will depend on the road surface over which the wheel is running. On a high friction surface, the brake pressure will be high and so the pressure dump rate will be high. Also the wheel will recover from a skid while there is still a substantial pressure in the brake. In this case a very short dump will be appropriate. On low friction surfaces, the dump rate is much slower, and the pressure must be dropped to a very low value before the wheel will recover from the skid. In this case the pressure dump must be much longer. The decision to terminate the pressure dump will therefore depend on a judgement of surface friction. On high friction surfaces, the pressure dump might be terminated while the wheel is still decelerating, but the rate at which it is decelerating is reducing. On lower friction surfaces, the pressure dump might continue until the wheel starts to re-accelerate, or even until the wheel is running once again at vehicle speed. When the conditions for termination of the pressure dump have been met, the wheel will move into a state 2 (box 64). This transition occurs at point B on FIG. 2.

State 2 is the wheel recovery monitoring state. When signs of wheel recovery appropriate to the surface have been seen and the pressure dump has been terminated, the brake pressure will be held at a constant level while the wheel recovery is monitored. On low friction surfaces, the wheel skid will be almost over before the wheel moves into state 2, but on high friction surfaces, the wheel speed might still be reducing. In either case, the brake pressure should have been reduced enough to allow the wheel to recover from the skid and return to running at vehicle speed. The logic associated with state 2 generates expected values for wheel speed and acceleration which will, if followed, brings the wheel back up to vehicle speed in an acceptable time. If the wheel speed and acceleration do not meet these expected values, then the wheel will move back into state 1 and further pressure will be dumped. If the wheel recovery continues satisfactorily, a decision must be taken about when to begin to re-apply the brake pressure. As with the decision to terminate pressure dump, this will depend on surface friction. On high friction surfaces, time spent with brake pressure lower than normal will result in longer stopping distances and so brake pressure should be re-applied as soon as it is clear that the wheel will recover from the skid. On very low friction surfaces, beginning pressure re-apply early can prevent the wheel returning to vehicle speed at all, which will have a detrimental effect on steering control and vehicle stability. In this case brake pressure should not be re-applied until the wheel is already running at vehicle speed. The decision to re-apply brake pressure will be based on a judgement of surface friction and on some combination of wheel speed and wheel acceleration behavior. When this condition is met, the wheel will move back into state 0. This transition occurs at point C on FIG. 2.

When the wheel is back in state 0, its speed and acceleration are monitored to detect skidding as before. The wheel having just recovered from a skid, the state 0 logic also controls the way in which brake pressure is re-applied. Minimum stopping distances are achieved by controlling the pressure in the brake at a high level on average. The brake pressure should therefore be maintained just below the level which will cause the wheel to skid (skid-pressure). Since this pressure can, in practice, change during a stop, the appropriate level of braking cannot be known, and so brake pressure must be re-applied until the wheel is made to skid again. On high friction surfaces, the brake pressure is often dumped to a level far below skid pressure, and so re-apply must be rapid in order to restore a high level of braking. When the pressure in the brake approaches skid-pressure, the re-applying rate should be reduced to delay the next skid, and so maximize the time spent with the brake pressure at a high level. On low friction surfaces, the wheels will skid at very low brake pressures, and so a very slow brake apply should be used from the start. Many electronic braking systems do not have any means of measuring brake pressures, so the decisions about pressure re-applying must be taken on the basis of a judgement of surface friction and a record of past ABS control activity. In systems which do have direct measurement of brake pressures, both the skid-pressure and the brake pressure during re-applying can be measured, and so decisions about pressure re-applying can be simplified.

Many of the decisions described above are taken based on a knowledge of vehicle speed or surface friction. Most electronic braking systems do not measure these variables directly. Vehicle speed is estimated by monitoring and filtering the speed signals from all of the road wheels. When wheels are skidding, this estimate can be improved by using a measurement of vehicle acceleration from a chassis mounted accelerometer if this is fitted as part of the system. Surface friction can be judged from vehicle-wide behavior, such as vehicle deceleration, or from the behavior of an individual wheel, such as re-acceleration rate after a wheel skid or skid-pressure if this can be measured. The information used to judge surface friction may be different for different decisions within the ABS logic.

In order to perform all of the functions described above, an anti-lock braking program is large and complex and requires a powerful computer to execute it.

In some known systems, the control of brake pressure in response to wheel skidding is performed entirely by the master controller. This takes advantage of the fact that the master controller can observe the behavior of the whole vehicle and can generate signals relating to the whole vehicle, such as vehicle speed. A disadvantage with this system is that there is a delay imposed by the need to communicate wheel speed information to the master controller, and later communicate brake pressure demands back to the local valves. This slows the response of the system to sudden skids, which can reduce the level of performance, particularly on low friction surfaces.

In other known systems, the control of brake pressure in response to wheel skidding is performed entirely by the local valve controllers. In such a system, there may even be no master controller at all. This system has the advantage of speed of response, but it requires all of the local valves to have access to vehicle-wide variables, and to contain the full ABS logic which uses this data. This creates a greater load for the communications bus, increases the complexity of the software controlling the communication, and demands a greater processing power from the local controllers, possibly requiring more expensive computers to be used.

SUMMARY OF THE INVENTION

It is an object of the present invention to provide a system which has the advantages of both known systems but in which the respective disadvantages of these known systems are eliminated or reduced.

In accordance with the present invention, there is provided an electronically controlled braking system incorporating anti-lock brake control and comprising a plurality of brake pressure control valves with associated electronic control units which communicate with one or more master electronic control units, wherein part of the anti-lock brake control logic for a wheel is performed by the electronic control unit associated with the pressure control valve for that wheel, with the remainder of the anti-lock brake control logic for that wheel being performed by said one or more master electronic control units which are in communication with the valve-associated electronic control units.

Preferably, signals from a wheel speed transducer are provided to the electronic control unit associated with the brake pressure control valve which controls the brake pressure at the wheel fitted with the wheel speed transducer.

Preferably, the valve-associated electronic control unit causes brake pressure to be reduced in response to a wheel skid detected by the said valve-associated electronic control unit, whereafter brake pressure is controlled according to demands communicated from a master electronic control unit.

The valve-associated electronic control unit can be arranged to halt the reduction in brake pressure in response to a change in wheel behavior which may indicate that the reduction in brake pressure has been effective in controlling the wheel skid.

In a preferred system, there is one master electronic control unit for the whole vehicle, and one brake pressure control valve for each wheel on the vehicle.

In other systems, the one or more master electronic control units are associated with and directly control one or more brake pressure control valves as well as communicating with other valve-associated electronic control units on the vehicle.

In a preferred system in accordance with the present invention, the ABS control logic is shared between the local controller and the master controller, with most of the complex logic performed by the master controller, but the response-time critical logic performed locally. The local controller within the valve monitors the wheel speed with a relatively simple skid detection algorithm. If a local controller detects a skid at its own wheel, it overrides the brake pressure demand from the master controller, and immediately reduces pressure at the wheel at the fastest rate possible. Communication with the master controller continues unaffected by the pressure dump. The master controller, which contains more sophisticated skid detection logic together with the pressure re-apply control logic, recognizes that the local controller has taken action to control a skid, and uses the vehicle-wide information that is available to it to calculate the appropriate pressure response to follow the initial dump. When this new brake demand is received by the valve controller, it returns to its normal mode of operation, matching the brake pressure to the demand from the master, and pays no further attention to the behavior of the wheels until instructed by the master controller.

A system in accordance with this invention has the advantages of both of the known systems described initially. Only the master controller performs full ABS control, and so only the master controller needs the processing power to do this, and only the master controller needs to be able to observe the behaviour of all of the wheels. The simple skid detection logic in the valve controller which is responsible for the rapid reduction in brake pressure in the event of impending wheel lock does not require the computing power of the master controller and yet is able to provide the speed of response of a fully distributed system.

BRIEF DESCRIPTION OF THE DRAWINGS

The invention is described further hereinafter, by way of example only, with reference to the accompanying drawings, in which.

DESCRIPTION OF THE PREFERRED EMBODIMENTS

Figure 1:
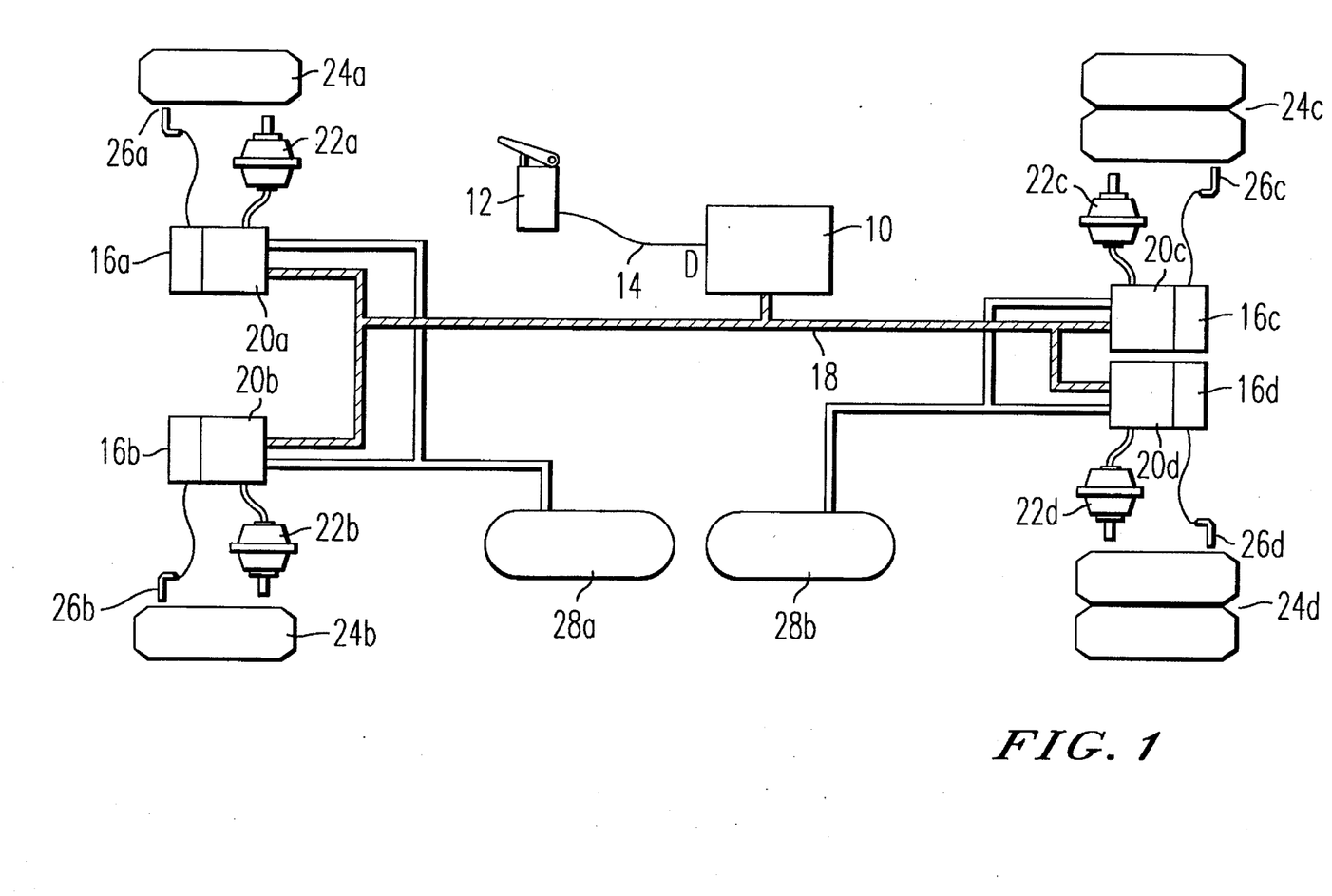
FIG. 1 is a diagrammatic illustration of an electronic braking system having a master controller and respective local controllers and pressure control valves at the wheels and which is capable of being adapted to operate in accordance with the present invention.

Referring first to FIG. 1, the illustrated braking control system comprises a master controller/computer 10 which receives driver braking demand signals D from a pedal operated transducer 12 via a line 14 and communicates with respective local controllers/computers 16a, 16b, 16c, 16d via a common communications bus 18. Each of the local controllers 16 is disposed adjacent to and is associated with, a respective pressure control valve 20a, 20b, 20c, 20d for each of the vehicle wheels (four in this example). The pressure control valves 20a, 20b control air pressure supplied to brake actuators 22a, 22b associated with the two front wheels 24c, 24b and the pressure control valves 20c, 20d control air pressures supplied to brake actuators 22c, 22d associated with the two rear wheels 24c, 24d. The rotational speed of each of the wheels 24 is monitored by respective wheel speed sensors 26a, 26b, 26c, 26d coupled to the associated local controllers 16a, 16b, 16c, 16d. First and second air reservoirs 28a, 28b supply pressured air to the front and rear valves respectively.

Figure 2:
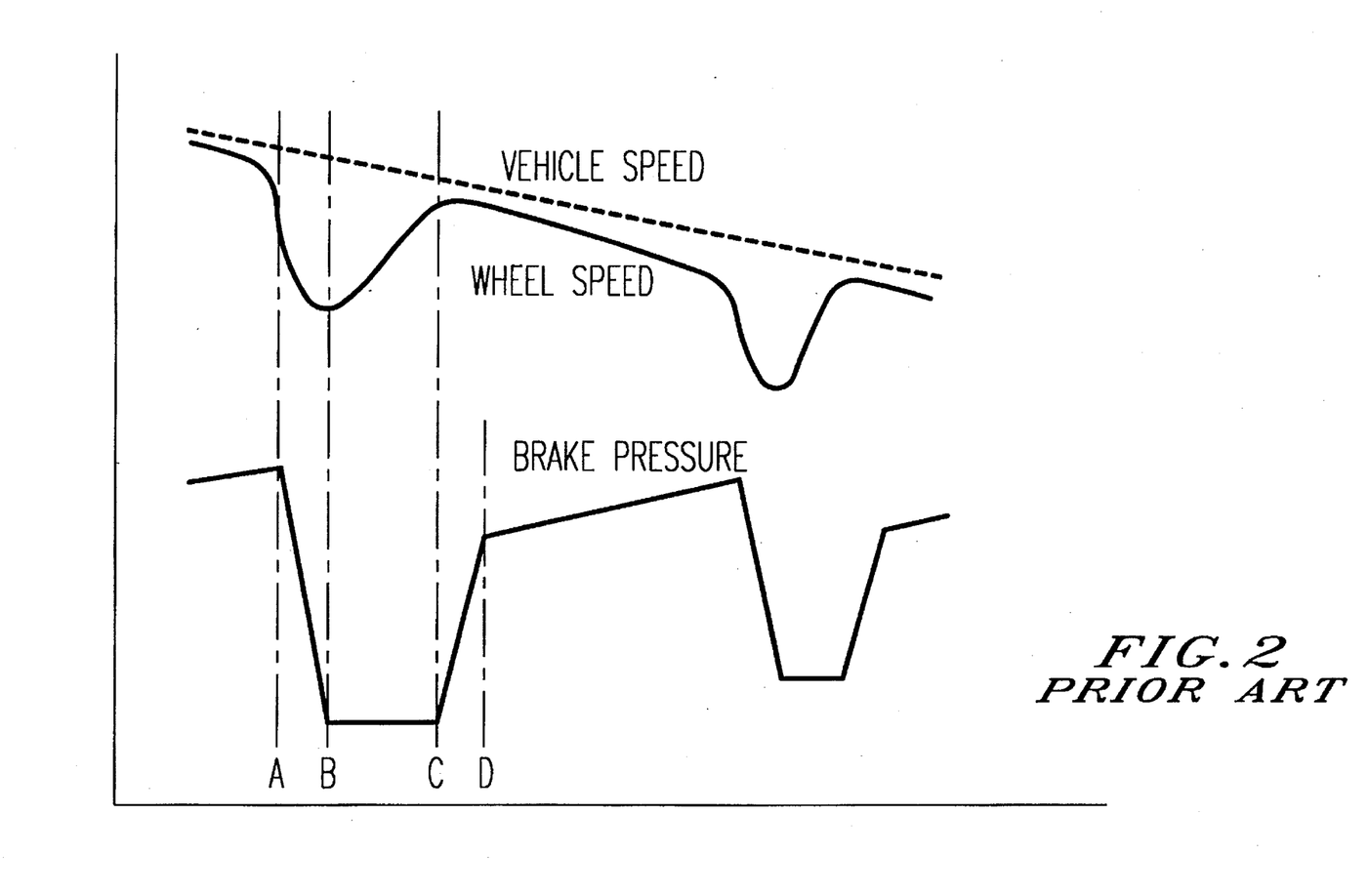
FIG. 2 shows typical ABS control behavior on a medium to high mu surface.

FIG. 2 shows typical ABS control behavior on a medium to high mu surface (mu=approx. 0.5 to 0.7). The pressure trace shows the two rate re-applying described hereinabove. Trace 1 in FIG. 2 identifies the vehicle speed; trace 2 identifies the wheel speed; and trace 3 identifies the brake pressure. Some significant stages in the ABS cycle, which will be identified by the full ABS logic, are indicated:

A—Skid detection—start of pressure dump

B—Start of wheel recovery—end of pressure dump

C—Wheel recovery complete—start of pressure re-applying

D—Pressure near to skid pressure—change in re-applying rate.

Figure 3:
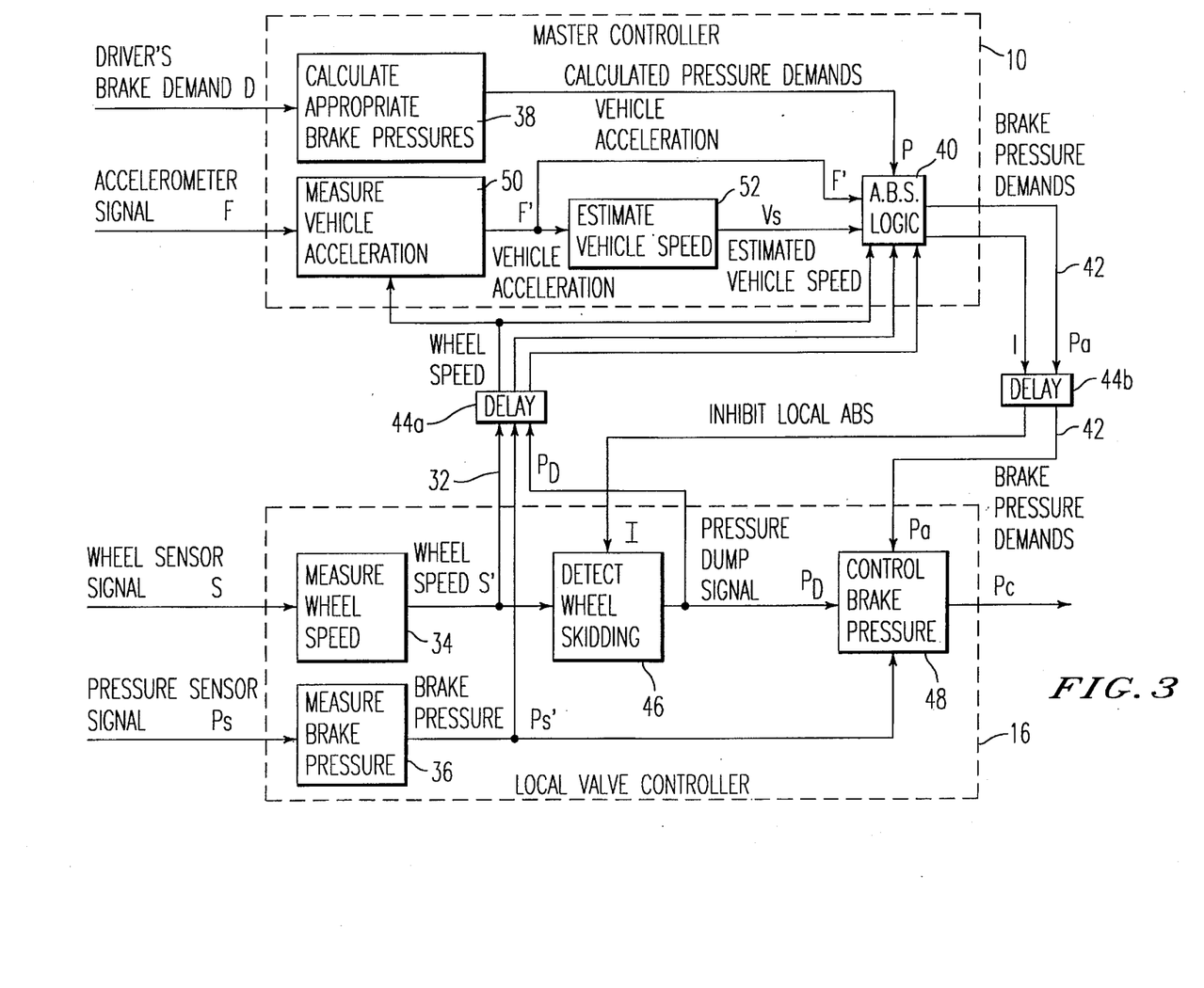
FIG. 3 is a block diagram illustrating part of a system embodying the present invention.

FIG. 3 shows a simplified signal flow through one local valve controller 16 and its master controller 10. In the case of a four-wheeled vehicle, there would be, in one possible embodiment, three other local valve controllers 16 with the same connections to the single master controller 10.

The local valve controller 16 monitors the signals S from an associated wheel speed sensor 26 (not shown in FIG. 3) and converts these in a measuring element 34 into a digital wheel speed value S' which is passed to the master controller 10 via a line 32 of the control bus 18 of FIG. 1. The local valve controller 16 also monitors the signals from a pressure sensor at the local brake actuator and converts these in a measuring element 36 into a digital brake pressure value Ps'.

The master controller 10 uses the driver's brake demand input D to calculate (in box 38) an appropriate brake pressure P for the wheel, without regard to wheel behavior. The calculated brake pressure demand P is then adjusted by the ABS logic 40 in response to the wheel speed information S' which is communicated from the local valve controller 16 on line 32. This adjusted demand Pa is communicated via a line 42 of the bus 18 to the local valve controller 16 which will normally generate pressure control signals to match the brake pressure to the demand from the master controller 10. When a wheel skids, the ABS logic 40 in the master will detect this and will respond by reducing the demanded pressure Pa transmitted to the local valve controller 16. However, delays in the communication of wheel speed signal S' from the valve, and brake demand Pa from the master controller 10, indicated diagrammatically in FIG. 3 by delay elements 44a, 44b in the lines 32, 42, would mean that the brake pressure response to the wheel skid would be late. To overcome this problem, a shortcut path is provided within the local valve controller 16. Simple skid detection logic 46 within the valve controller 16 monitors the wheel speed S' and can generate a pressure dump signal Pd which will override for a limited period the brake pressure demand Pa communicated from the master controller 10 to a brake pressure control element 48 which supplies the pressure control signals Pc for the brake actuator 22 (not shown in FIG. 3).

As shown in FIG. 3, the master controller 10 also measures vehicle acceleration in block 50 to provide a digital acceleration signal F' based on a signal F from a vehicle-mounted accelerometer (not shown). The master controller 10 uses this signal F' together with the wheel speed signals S' received from the several local valve controllers 16 to calculate in box 52 an estimated vehicle speed Vs. It also uses both the estimated vehicle speed Vs and the calculated vehicle acceleration F' in the ABS logic 40 as indicators of overall vehicle performance.

Three signals are shown in FIG. 3 to go from the valve controller 16 to the master controller 10. These are the wheel speed signals S' as described above which is used in the ABS logic 40 and to estimate vehicle speed, the brake pressure signals Ps' used in the ABS logic 40, and the pressure dump signal PD from the local skid detection logic 46 in the valve controller. The transference of the latter signal to the master controller is optional. The master controller 10 can use this signal, if provided, to determine that the valve controller 16 has dumped brake pressure is response to a wheel skid. If this signal PD is not present then the master controller can make the same determination by having, within its own ABS logic 40, a copy of the skid detection logic (46) of the valve controller 16. The master controller 10 receives wheel speed information S' from the valve controller 16, and so can use the same logic as the valve controller to determine what action the valve controller will have taken.

In a preferred embodiment, the master controller 10 calculates vehicle-wide data, for example vehicle speed, and communicates this to the local valve controllers for use by the local controllers in taking ABS decisions.

Two signals are shown in FIG. 3 to go from the master controller 10 to the valve controller 16. One of these is the brake pressure demand signal Pa from the ABS logic 40. The other is a signal I which can inhibit local skid detection within the valve controller 16 and force the valve to match brake pressure to the demanded pressure Pa. The second signal is again optional. On a system where the signal I is present, it can be used to inhibit local ABS activity in the event that a wheel speed sensor becomes faulty and gives a false indication of wheel skidding. In addition, it can be used to fix the change from local ABS control to central ABS control after the pressure dump part of the ABS cycle has been completed. If this signal I is not present, then these decisions would be taken locally within the valve controller 16.

Figure 4:
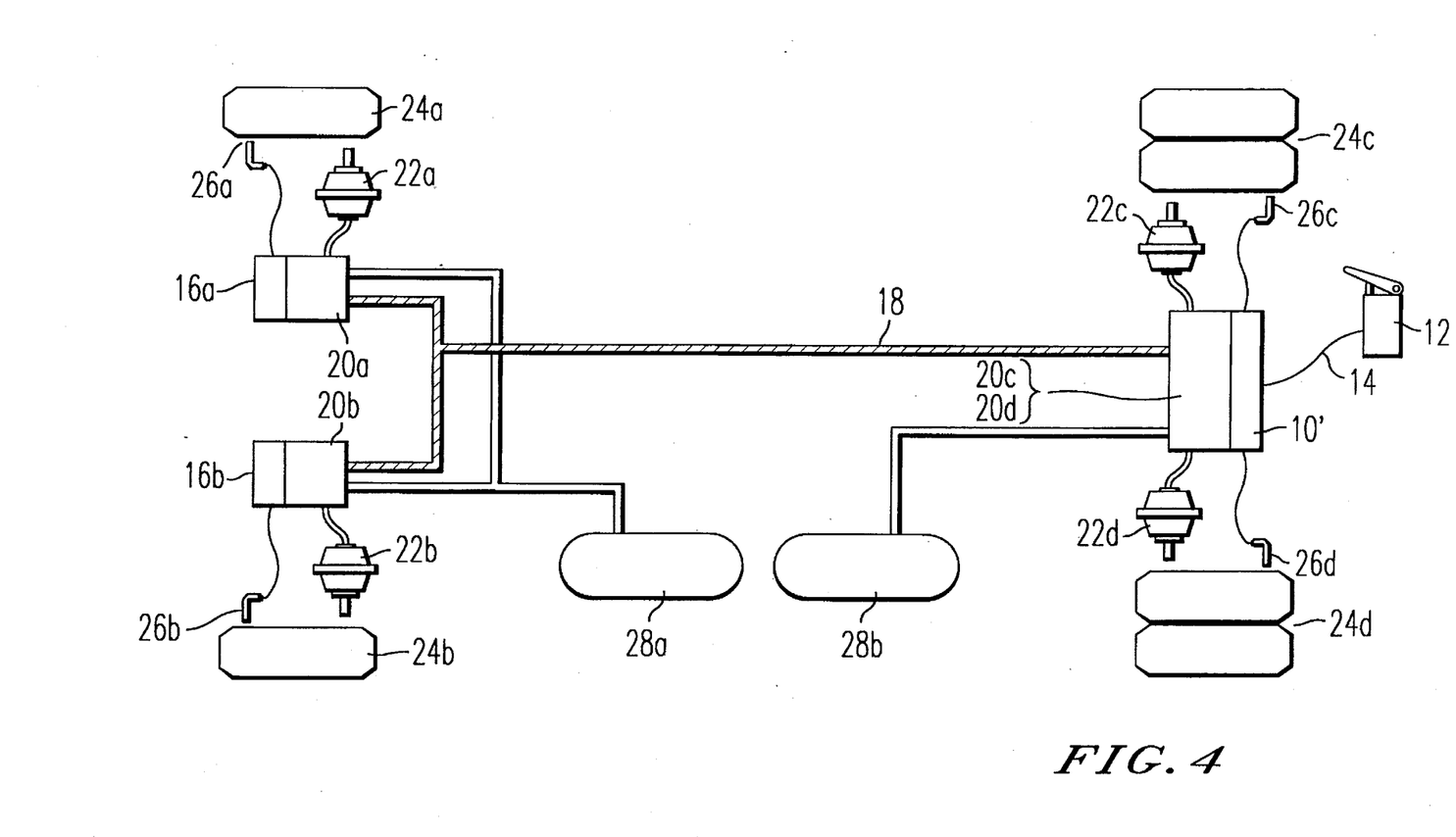
FIG. 4 is a diagrammatic illustration of a modified braking system, similar to that of FIG. 1, but wherein the master controller also serves as a local pressure controller for the rear wheels.

FIG. 4 shows a simplified diagram of an air braked vehicle in which the master controller 10' also serves as a local pressure controller for the two rear wheels 24c, 24d while the front wheels 24a, 24b are controlled by separate local pressure controllers 16a, 16b as in the case of FIG. 1. Apart from the latter variation, the system of FIG. 4 is identical to that of FIG. 1.

Figure 6:
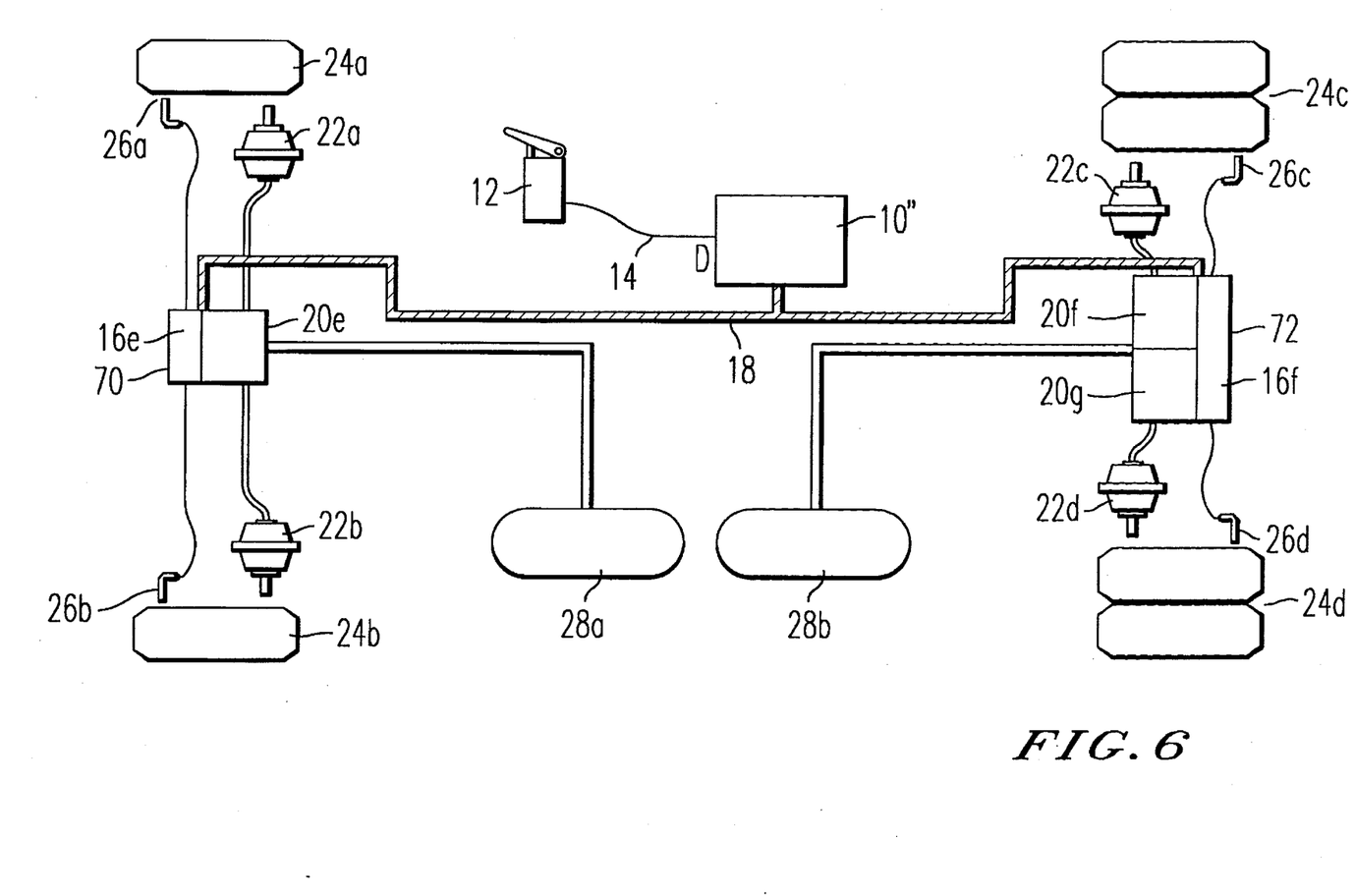
FIG. 6 is a diagrammatic illustration of a modified braking system, similar to that of FIG. 1, but wherein there is one central master controller, a single module incorporating one pressure control valve and one local valve controller controlling both front brakes, and a further module incorporating two pressure control valves and one local pressure controller for controlling the rear brakes independently.

FIG. 6 is a simplified diagram of a still further version of a system architecture incorporating the present invention in which there is a single central master controller 10", one module 70 incorporating one pressure control valve 20e and one local valve controller 16 which is disposed at the front of the vehicle and controls both front brakes to the same pressure, and one module 72 incorporating two pressure control valves 20f, 20g and one local valve controller 16f which controls the pressure in the two rear brakes independently. A further variation of this architecture could include a third axle which is controlled either by an additional single channel module of the type that controls the front brakes, or by an additional two channel module of the type which controls the rear brakes. A fourth axle in this architecture could be controlled by linking the additional brakes on the same side of the vehicle on an adjacent axle, without additional control modules.

It will be evident from the aforegoing that the basic concept of splitting ABS control logic between two or more controllers can be implemented on a great many different architectures. In the simplest architecture described above in connection with FIG. 1, a single master ECU communicates with a number of valve ECUs, each of which operate one pressure control valve which controls the pressure at one brake. However, it is not intended that the term "master ECU" should apply only to ECUs which do not have direct control of pressure control valves, nor is it intended that the term "valve-associated ECU" should apply only to ECUs which have direct control of only one pressure control valve. Other system architectures are possible, including:

(a) a master ECU which has direct control of a number of pressure control valves as well as communicating with a number of valve-associated ECUs;

(b) a pressure control valve which controls the pressure at more than one brake; and (c) a valve-associated ECU which controls more that one pressure control valve.

Thus, in summary of the aforegoing, a "master electronic control unit (ECU)" is one which contains part of the ABS algorithm which is concerned with system-wide data, and supplies brake pressure demands to a valve-associated ECU; and a "valve-associated ECU/local electronic control unit" is one which contains another part of the ABS algorithm which is concerned only with local data, and which can override pressure commands from the master ECU.

In still further variations of the present invention, the partially distributed ABS control can be applied to some and not all of the brakes of the system. For example, the ABS can be shared between the master ECU and some, but not all, of the valve-associated electronic control units. Those wheels which are controlled by valve-associated electronic unit containing no ABS logic, have ABS control performed entirely by the master controller. A particular application of the latter system has ABS control logic for the front axle shared between the master controller and the valve controller which controls the front axle. ABS control logic for other axles on the vehicle is contained entirely within the master electronic control unit/or units.

I claim:

1. An electronically controlled braking system for a wheeled vehicle, incorporating anti-lock brake control and comprising:

a plurality of brake pressure control valves;

a plurality of local electronic control units associated with said brake pressure control valves;

at least one master electronic control unit which communicates electronically with said plurality of valve-associated local electronic control units;

two-way coupling means connecting said master electronic control unit with said plurality of local electronic control units for enabling the passage of electronic signals therebetween;

means within said master electronic control unit for receiving driver generated demands to establish a desired braking pressure demand signal which is passed via said coupling means to said local control units;

respective means within each of said plurality of local electronic control units for receiving wheel speed sensor signals and generating wheel speed signals representative of the speed of the individual wheels with which those local control units are respectively associated;

skid control means located in said master control unit which is responsive to wheel speed signals provided by said local control units to modify said desired braking pressure demand signal, passed to said local control units via said coupling means, in accordance with an anti-skid algorithm for preventing wheel locking; and a respective skid detection means in each said local control unit which receives said wheel speed signals respectively generated within said local control unit and, upon detection of a wheel skid condition, causes said pressure demand signal received via said coupling means from said master control unit to be overridden for a predetermined time and temporarily reduce brake pressure at said pressure control valve associated therewith, until at least such time as said desired pressure demand signal received via said coupling means from said master controller has been modified by said skid control mens in the master controller in response to said wheel skid condition.

2. An electronically controlled braking system according to claim 1, wherein said skid detection means in each of said local electronic control units is responsive to a detected change in wheel behavior, which indicates whether said reduction in brake pressure has been effective in controlling said wheel skid condition, to halt said reduction in braking pressure.

3. A system according to claim 1, wherein said estimate of vehicle speed is transmitted via said coupling means from the master controller to each of said valve-associated electronic control units for use in taking logic control decisions.

4. A system according to claim 1, which comprises means in each said local electronic control unit which sends a specific signal to said master electronic control unit when said local electronic control unit takes a decision to set a brake pressure to a level determined by said skid detection means in said local electronic unit rather than to a level demanded by said master electronic control unit.

5. A system according to claim 1, which comprises means in said at least one master electronic control unit for sending a specific signal to at least one of said local electronic control units to force said at least one said local electronic control unit to set said desired braking pressure demand signal in response to said brake pressure demand signal sent from said at least one master electronic control unit via said coupling means.

6. An electrically controlled braking system according to claim 1, wherein said master electronic control unit is provided for the whole vehicle, and one brake pressure control valve is provided for each wheel on the vehicle.

7. An electronically controlled braking system according to claim 1, wherein said at least one master electronic control unit directly controls at least one of said brake pressure control valves as well as communicating with the other of said plurality of valve-associated electronic control units on the vehicle.

8. A system according to claim 1, wherein one of said brake pressure control valves controls the brake pressure at at least two wheels.

9. A system according to claim 1, wherein at least two said brake pressure control valves share one of said local electronic units.

10. An electronically controlled braking system for a wheeled vehicle, incorporating anti-lock brake control and comprising:

a plurality of brake pressure control valves;

a plurality of local electronic control units associated with said brake pressure control valves;

at least one master electronic control unit communicating electronically with said plurality of valve-associated local electronic control units;

a two-way coupling connecting said master electronic control unit with said plurality of local electronic control units and enabling the passage of electronic signals therebetween;

a mechanism within said master electronic control unit receiving driver generated demands establishing a desired braking pressure demand signal which is passed via said coupling to said local control units;

a respective mechanism within each of said plurality of local electronic control units, said mechanism receiving wheel speed sensor signals and generating wheel speed signals representative of the speed of the individual wheels with which said local control units are respectively associated;

a skid control located in said master control unit which is responsive to wheel speed signals provided by said local control units to modify said desired braking pressure demand signal, passed to said local control units via said coupling, in accordance with an anti-skid algorithm preventing wheel locking; and a respective skid detection mechanism in each of said local control units which receives said wheel speed signals respectively generated within each said local control unit and, upon detection of a wheel skid condition, causes said pressure demand signal received via said coupling from said master control unit to be overridden for a predetermined time and temporarily reduce brake pressure at said pressure control valve associated therewith until at least such time as said desired pressure demand signal received via said coupling from said master controller has itself been modified by said skid control in the master controller in response to said wheel skid condition.

11. An electronically controlled braking system according to claim 10, wherein said skid detector in each of said local electronic control units is responsive to a detected change in wheel behavior, which indicates whether said reduction in brake pressure has been effective in controlling said wheel skid condition, to halt said reduction in brake pressure.

12. A system according to claim 10, wherein said estimate of vehicle speed is transmitted via said coupling from the master controller to each of said valve-associated electronic control units for use in taking logic control decisions.

13. A system according to claim 10, which comprises a mechanism located in each of said local electronic control units which sends a specific signal to said master electronic control unit when said local electronic control unit takes a decision setting a brake pressure to a level determined by said skid detector in said local electronic control unit rather than to a level demanded by said master electronic control unit.

14. A system according to claim 10, which comprises a mechanism located in said at least one master electronic control unit, said mechanism sending a specific signal to at least one of said local electronic control units and forcing said at least one local electronic control unit to set said desired braking pressure demand signal in response to said brake pressure demand signal sent from said at least one master electronic control unit via said coupling.

15. An electronically controlled braking system according to claim 10, wherein said master electronic control unit is provided for the whole vehicle and one brake pressure control valve is provided for each wheel on the vehicle.

16. An electronically controlled braking system according to claim 10, wherein said at least one master electronic control unit directly controls at least one of said brake pressure control valves as well as communicating with other of said plurality of valve-associated electronic control units on the vehicle.

17. A system according to claim 10, wherein one of said brake pressure control valve controls the brake pressure at at least two wheels.

18. A system according to claim 10, wherein at least two of said brake pressure control valves share one of said local electronic units.

* * * * *